Patented June 19, 1923.

1,459,303

UNITED STATES PATENT OFFICE.

GEORGE R. HUDSON, OF PORTLAND, AND FRANKLIN M. CULP, OF CORVALLIS, OREGON.

TIRE CHANGER.

Application filed September 20, 1921. Serial No. 502,019.

*To all whom it may concern:*

Be it hereby known that we, GEORGE R. HUDSON and FRANKLIN M. CULP, citizens of the United States, and residents, respectively, of Portland, county of Multnomah, and State of Oregon, and Corvallis, county of Benton, and State of Oregon, have invented a new and useful Tire Changer, of which the following is a specification.

This invention relates more particularly to a means for removing a pneumatic tire from what is known as a split rim and for putting tires on such rims.

The objects of our invention are to provide an exceedingly simple, efficient and convenient means for mounting and demounting pneumatic tires on split rims with the minimum amount of labor and without subjecting the rim or tire to unnecessary strains.

We accomplish these results in the manner set forth in the following specification and illustrated in the accompanying drawing, in which:—

Figure 1:
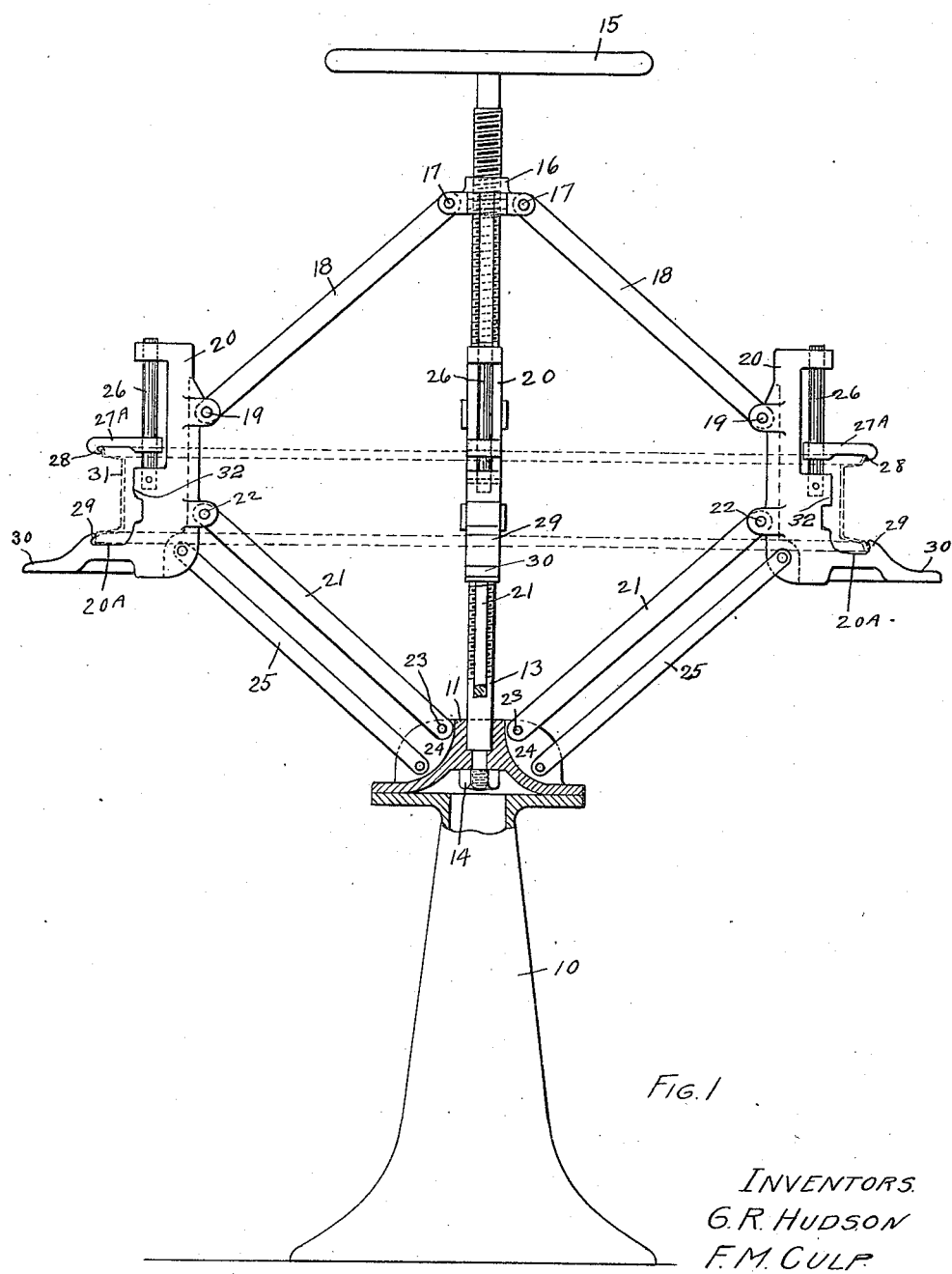
Figure 2:
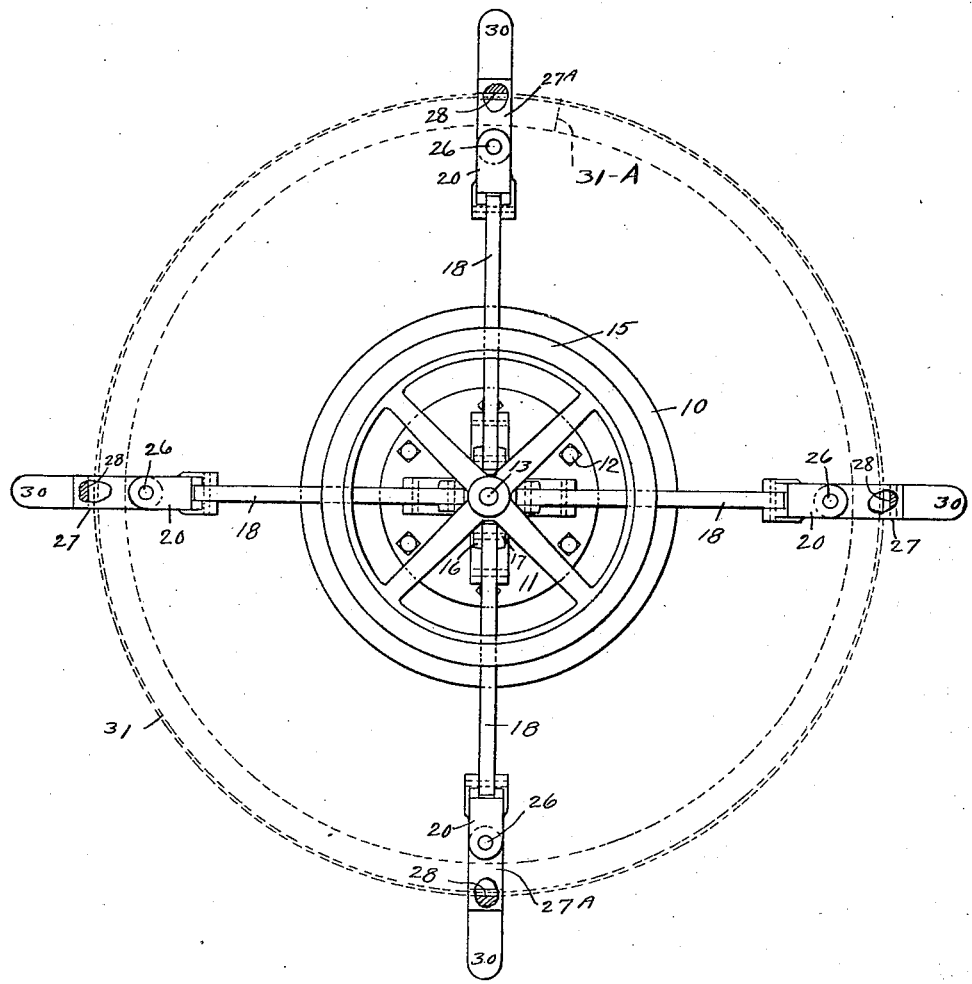

Figure 1 is a front elevation of the device with a portion cut away in section for the sake of clearness. Figure 2 is a plan in which portions of the rim-engaging hooks are cut away in section for the purpose of illustrating the operation of the two sets of hooks.

Similar numbers and letters of reference refer to the same or similar parts throughout the views.

Referring in detail to the drawings, we have constructed our device of a pedestal member 10 which is adapted to be secured to the floor. To the top of the pedestal 10 is secured a base 11 by means of the bolts 12. Rotatably mounted in the center of the base 11 is the vertical screw 13 whose lower end is shouldered and provided with a nut 14 which prevents it from being withdrawn from the base 11. Secured to the upper end of the screw 13 is a hand wheel 15.

On the screw 13 is a nut 16 provided with four slots which are at right angles to each other. In each of these slots by means of the pins 17 is hinged a link 18 whose lower end is hinged by the pin 19 to the upper end of a vertical frame 20. A similar link 21 is joined to the lower end of the frame 20 by means of the pin 22. The lower end of the link 21 is hinged by means of the pin 23 within the slot 24 in the base 11. It will be understood that there are four of these slots 24 in the base 11 which correspond with the slots in the nut 16.

A lighter link 25 having the same length as the link 21 and hinged between the same parts 11 and 20 forms a parallelogram which tends to hold the frame 20 in a vertical position.

In the frames 20 we have mounted the vertical rods 26 upon two of which are rotatably placed the hooks 27 whose hook portions 28 are adapted to engage the edge of a rim. The lower ends of the frames 20 are provided with the permanent hooks 29 and extensions 30 for supporting the tire itself when not held by the rim 31. The face 32 is slightly irregular and is adapted to correspond with certain styles of rims now in the market. The faces 32 of the four frames 20 have the sam radii from the axis of the screw 13. Upon the two remaining rods we have placed the hooks 27$^A$ which are, however, slightly shorter than are the hooks 27, for reasons which will soon become apparent.

The operation of our device is as follows: When desiring to remove a tire from the rim 31, it is placed in the position indicated in the drawings with its break 31$^A$ to one side of the shorter hooks 27$^A$. The hooks 27 and 27$^A$ are now swung around on the rods 26 and brought into engagement with the edge of the rim 31. The opposite edge of the rim 31, which rests on the shoulder 20$^A$ of the frame 20, is now in a position to be engaged by the hooks 29.

It will be seen that any rotation of the hand wheel 15 which causes the nut 16 to rise will draw the four frames 20 toward the screw 13 and it will be observed that the shorter hooks 27$^A$ will come into action first and break the rim at its joint before trying to compress same. This is a highly important feature in the construction of this device. When the hand wheel 15 has been sufficiently rotated, the tire will drop off and rest on the extensions 30.

In order to mount a tire on the rim the operation is reversed, that is, the nut 16 is forced downwards and the frames 20 outwardly so that the faces 32 press outwardly against the interior of the rim 31. It will be understood, of course, that in this operation it is not necessary for the hooks 27 and 27$^A$ to be engaged.

We are aware that various styles of devices have been produced to accomplish this purpose, we therefore do not claim this device broadly but only within the limits specified in the following claims.

What we claim as new is:

1. In a frame for tire changers, the combination of a vertical frame member shaped to fit the inside of a rim and having a fixed outwardly projecting hook formed on the lower end of said frame, with a vertical rod supported at both ends by said frame, a hook slidably and rotatably mounted on said rod between said supports above said fixed hook, and means for moving said frame inwardly and outwardly with relation to the rim.

2. In a tire changer, the combination of a pedestal, a base mounted on said pedestal, a vertical screw rotatably mounted on said base, a handwheel on the upper end of said screw, a nut on said screw between said handwheel and base, four vertical frames disposed around said screw between said nut and base, pairs of toggle links hinging each frame to the nut and base, a parallelogram forming link parallel to and below the lower link of each pair of toggle links and hinged to the frame and base, a fixed hook projecting outwardly from each frame, a vertical rod secured on the outer side of each of said frames, a hook slidably hinged on said rod above each fixed hook, one opposite pair of said movable hooks being slightly nearer together than are the adjacent pair.

GEORGE R. HUDSON.
FRANKLIN M. CULP.